US005251111A

United States Patent [19]

Nagengast et al.

[11] Patent Number: 5,251,111

[45] Date of Patent: Oct. 5, 1993

[54] COMPOSITE HEADLAMP VENT DEVICE

[75] Inventors: William E. Nagengast; David R. Mc Mahan, both of Anderson, Ind.

[73] Assignee: General Motors Corporation, Detroit, Mich.

[21] Appl. No.: 952,235

[22] Filed: Sep. 28, 1992

[51] Int. Cl.[5] .................................... B60Q 1/04

[52] U.S. Cl. .................................... 362/61; 362/294; 137/202

[58] Field of Search .................. 362/61, 294, 345, 373, 362/96; 137/202

[56] References Cited

U.S. PATENT DOCUMENTS

| | | | |
|---|---|---|---|
| 2,603,493 | 7/1952 | Rusconi | 137/202 |
| 3,377,480 | 4/1968 | Robertson | 240/47 |
| 3,593,017 | 7/1971 | Cibie | 362/294 |
| 4,747,032 | 5/1988 | Weber | 362/294 |
| 4,802,068 | 1/1989 | Mokry | 362/96 |
| 4,809,144 | 2/1989 | Suzuki | 362/294 |
| 4,862,337 | 8/1989 | Ohshio et al. | 362/294 |
| 5,010,453 | 4/1991 | Ketterman | 362/294 |

FOREIGN PATENT DOCUMENTS

| | | |
|---|---|---|
| 3220704 | 3/1984 | Fed. Rep. of Germany . |

*Primary Examiner*—Albert J. Makay
*Assistant Examiner*—L. Heyman
*Attorney, Agent, or Firm*—Edward J. Biskup

[57] ABSTRACT

A ventilation system for a composite head lamp that utilizes a one-way valve arrangement for permitting ventilating air to flow into and out of the headlamp but prevents splash water from entering the interior of the headlamp.

9 Claims, 2 Drawing Sheets

COMPOSITE HEADLAMP VENT DEVICE

BACKGROUND OF THE INVENTION

This invention concerns headlamps of the replaceable bulb type and more particularly concerns a ventilation system having a vent assembly that permits air to flow into and out of the headlamp without permitting splash water from gaining access into the interior of the headlamp.

SUMMARY OF THE INVENTION

More specifically, the present invention is directed to a ventilation system for a composite headlamp having a reflector member the front portion of which is closed by a lens. The reflector member is formed with a backwall defined by an inner curved reflecting surface and an outer support surface. A light source is located at the focal point of the reflecting surface so as to allow the reflecting surface to project light rays forwardly through the lens, and a mounting hole is formed in the reflector member through which ventilating air can flow into and out of the headlamp. Ventilation of the headlamp is provided by a vent assembly which is formed with a connector secured within the mounting hole. The vent assembly includes a tubular member having one end connected to the connector, and the other end of the tubular member is connected to a valve device for preventing water from gaining access into the interior of the lamp. In the preferred form, the valve device takes the form of a housing consisting of a base member capped with a dome member. A first passage is provided in the dome member for connection with the other end of the tubular member and a second passage is provided in the base member for connection with atmosphere. The first passage in the dome member is adapted to be closed by a buoyant member located within the housing that rises to close the first passage when water enters the housing.

The objects of the present invention are to provide a new and improved ventilation system for a composite head lamp that utilizes a valve device for permitting ventilating air to flow into and out of the headlamp but prevents splash water from entering the interior of the headlamp; to provide a new and improved ventilation system for a headlamp that has a vent assembly provided with a housing incorporating a valve member having buoyancy so as to cause the valve member to rise to close a passage leading to the interior of the headlamp whenever water enters the housing; to provide a new and improved vent assembly for a headlamp ventilation system that includes a valve device consisting of a ball type valve which serves to close an inlet port leading to the interior of the headlamp whenever water enters the valve device; and to provide a new and improved vent device which forms a part of a ventilation system for a replaceable bulb type headlamp that includes a buoyant valve member for preventing water from gaining access to the interior of the headlamp and in which the housing within which the valve member is located can be rotated so as allow the vent device to be properly positioned at various points of the headlamp and still allow the the valve member to rise to block water from entering the body of the headlamp whenever water enters the housing.

Other objects and advantages of the present invention will be more apparent from the following detailed description of the invention when taken with the drawings in which:

DETAILED DESCRIPTION OF THE PREFERRED EMBODIMENT

Figure 1:
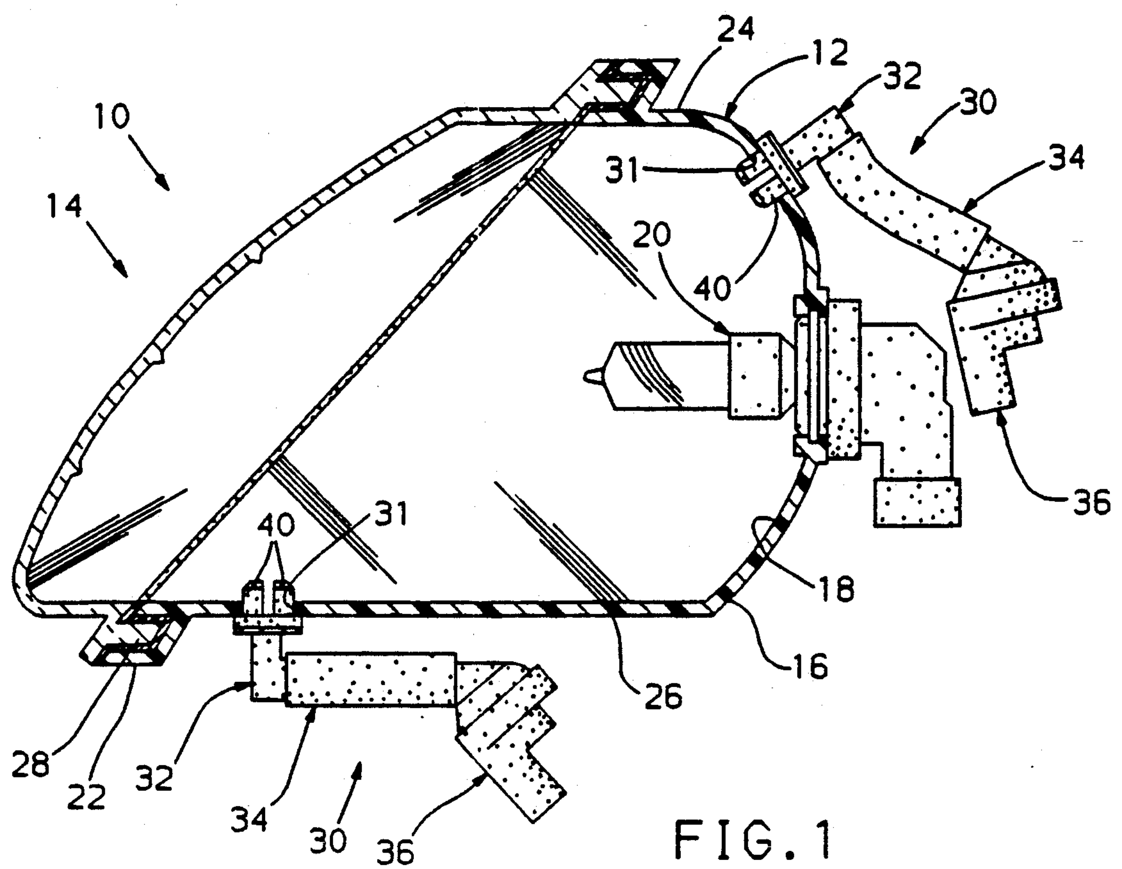
FIG. 1 is an elevation view showing a replaceable light bulb headlamp incorporating a ventilation system made in accordance with the present invention that includes a pair of identical vent assemblies.

Referring now to the drawings and more particularly to FIG. 1 thereof, a replaceable bulb composite headlamp 10 is shown of the rectangular type comprising a reflector member 12 made of a plastic material and having the front face thereof closed by a glass or plastic lens 14. Although not shown, the reflector member 12 includes a pair of side-by-side cavities each of which is partially formed by a parabolic backwall defined by a curved outer surface 16 and a parabolic curved inner surface 18 the latter of which is aluminized so as to provide the usual parabolic reflecting surface for projecting a forwardly directed beam of light originating at a light source such as a replaceable bulb 20 located in the center of the associated cavity.

More specifically, the front face of the reflector member 12 is defined by a rectangular flange 22 integrally formed with and surrounding the open end of the cavities. A horizontally orientated top wall 24 and a horizontally orientated bottom wall 26 are integrally formed with the backwall and together with the flange 22 define the cavities of the reflector member 12. As is conventional, a continuous channel of uniform depth is formed in the flange of the reflector member 12 around the entire margin of the front face thereof. The lens 14 has a flange 28 located within the channel and is bonded to the front face of the reflector member 12 by an adhesive such as butyl rubber which also serves as a sealant.

In order to vent the headlamp 10 so as to prevent moisture from collecting within the headlamp 10 and to prevent splash water from gaining access to the interior thereof, the headlamp 10 is provided with a ventilation system, made in accordance with the invention, which as seen in FIG. 1, includes a pair of identical vent assemblies 30. Each of the vent assemblies 30 is supported within a circular mounting hole 31 formed in the reflector member 12. In this regard, one of the vent assemblies 30 is mounted to the outer surface of the backwall while the other vent assembly 30 is mounted to the bottom wall 26 of the reflector member 12.

Figure 2:
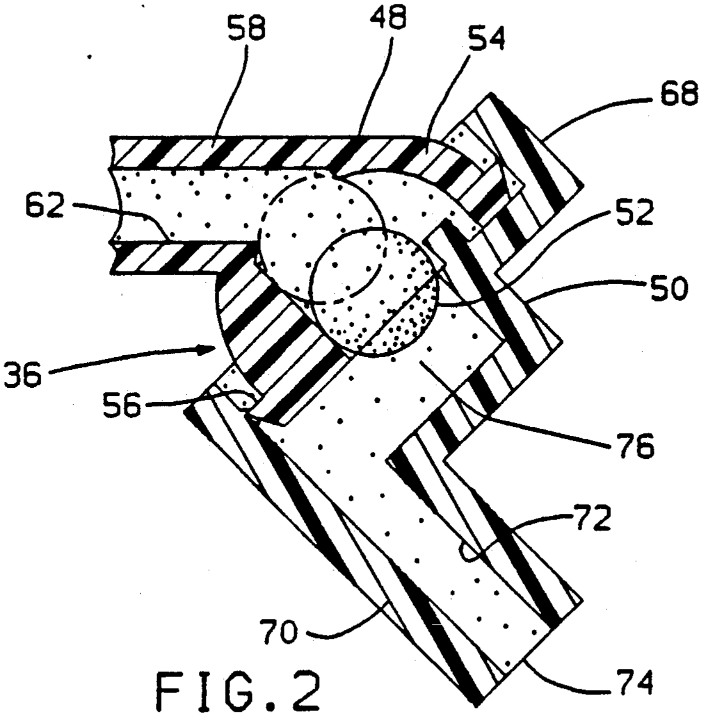
FIG. 2 is an enlarged sectional view of a vent device which is a part of one of the vent assemblies forming the ventilation system for the headlamp of FIG. 1.

As best seen in FIGS. 1 and 2, each vent assembly 30 is composed of a connector member 32, a tubular member 34 made of a resilient elastomeric material, and a valve device 36.

Figure 6:
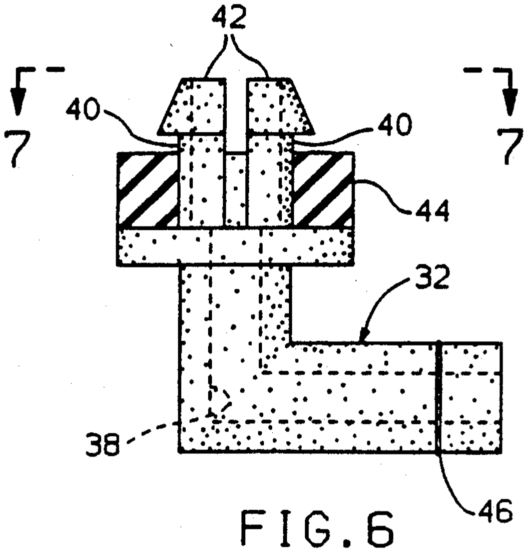
FIG. 6 is an elevational view of a connector member which forms another part of the vent assembly seen in FIG. 1.
Figure 7:
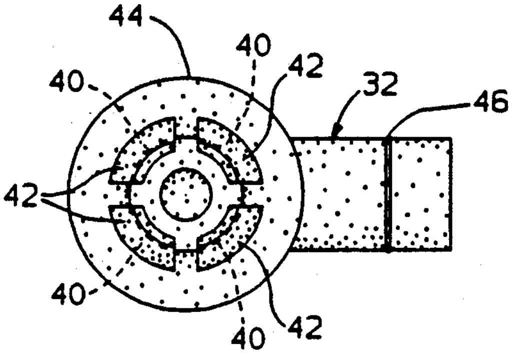
FIG. 7 is a view taken on line 7—7 of FIG. 6.

As best seen in FIGS. 6 and 7, the connector member 32 is a one-piece, L-shaped molded member and is made of a relatively rigid plastic material such as Nylon. A through-passage 38 is provided that extends through each of the legs of the connector member with one leg terminating with a circular collar having four identical and equally circumferentially spaced upstanding relatively flexible fingers. Each of the fingers 42 is identified by the reference numeral 40 and each has the free end thereof formed with a barb-like portion 42 the peripheral part of which lies on a circle larger than the diameter of the mounting hole 31. A ring-shaped seal member 44 in the form of a washer surrounds the fingers while the other leg of the connector member is integrally formed with an enlarged ring 46 which permits one end of the tubular member 34 to be retained thereon as seen in FIG. 1.

As seen in FIG. 1, the valve device 36 is connected to the other end of the tubular member 34 to form the vent assembly 30. As best seen in FIGS. 2-5, the valve device 36 consists of three separable parts; namely, a dome member 48, a base member 50, and a ball member 52 all of which are normally combined to form a unitary housing as seen in FIG. 2.

Figure 3:
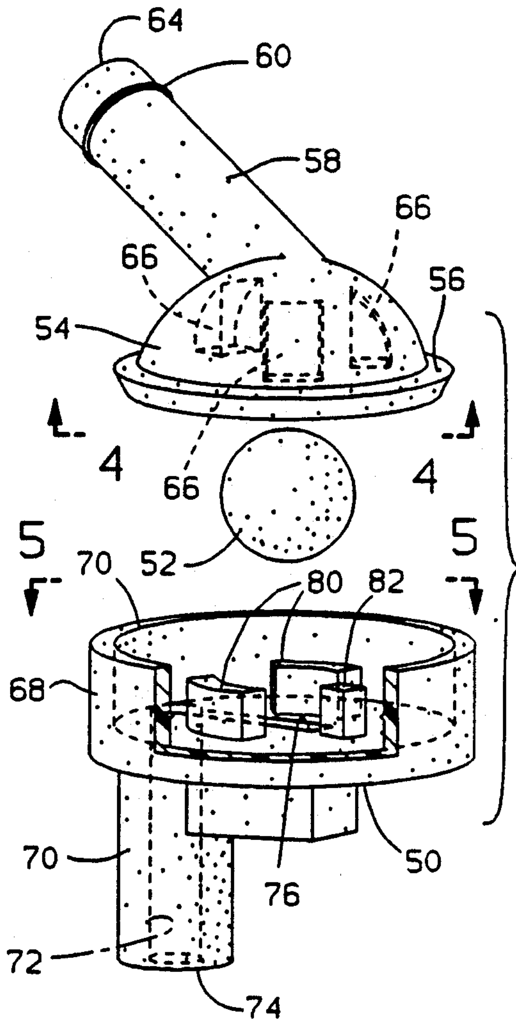
FIG. 3 is an exploded perspective view showing the various parts of the valve device seen in FIG. 2.
Figure 4:
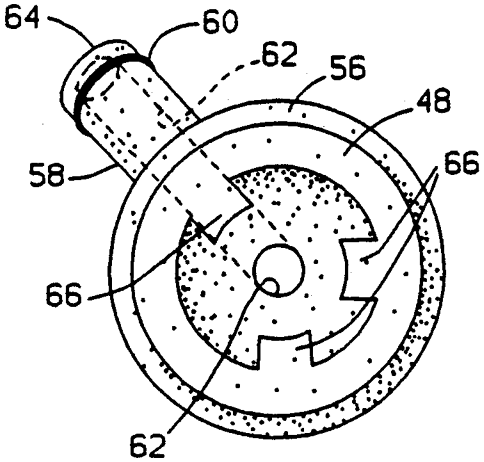
FIG. 4 is a view taken on line 4—4 of FIG. 3.

As in the case of the connector member 32, both the dome member 48 and the base member 50 are molded members made of a relatively rigid plastic material such as Nylon. As seen in FIG. 3, the dome member 48 is formed with a semi-spherical section 54 terminating at its lower end with a ring-like portion 56 adapted to be snap-fitted into the base member 50 or otherwise secured thereto as seen in FIG. 2. The upper end of the semi-spherical section 54 is integrally formed with a cylindrical extension 58, the free end of which has an enlarged ring 60 integrally formed therewith for facilitating and maintaining a good connection with the cylindrical interior surface of the tubular member 34. The cylindrical extension 58 is formed with a passage 62 which connects the inner portion of the semi-spherical section 54 with the free end 64 of the extension. In addition, as seen in FIG. 4, the interior of the semi-spherical section 54 is integrally formed with three circumferentially and equally spaced guide members each of which is identified by reference numeral 66.

Figure 5:
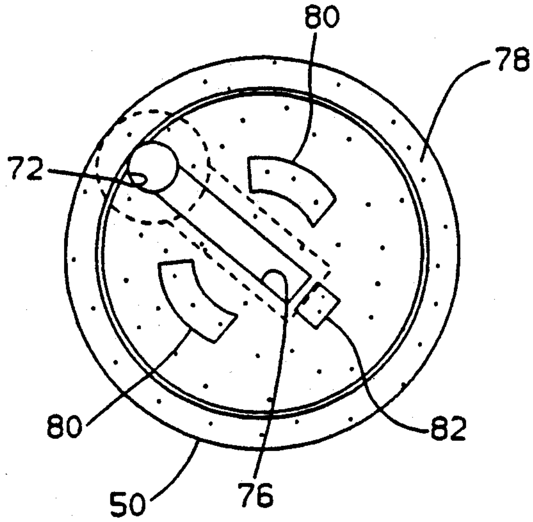
FIG. 5 is a view taken on line 5—5 of FIG. 3.

The base member 50 includes a circular section 68 integrally formed with a cylindrical extension 70 which, as in the case of the cylindrical extension 58 of the dome member 48, is formed with a passage 72. In this instance, the passage 72 connects the free end 74 of the extension 70 with a trough 76 which lies along an axis perpendicular to the longitudinal axis of the passage 72 in the cylindrical extension 70. As seen in FIGS. 3 and 5, the circular section 68 is formed with a wall 78 which surrounds three guide members, two of which are arcuate in configuration and identified by reference numeral 80 and one of which is rectangular in configuration and identified by reference numeral 82. The guide numbers 80 and 82 are integral with the circular section 68.

When the dome member 48 is assembled to the base member 50, the guide members 66, 80 and 82 formed with the members 48 and 50 serve to trap the ball member 52 and allow the latter to move between the full line position and the phantom line position seen in FIG. 2. The ball member 52 is made of a material which allows it to be buoyant so if splash water should flow into the valve device 36 via the passage 72 in the cylindrical extension 70, the water will raise the ball member 52 to the phantom position of FIG. 2 to close the passage 62 in the cylindrical extension 58 of the dome member 48.

From the above description, it should be apparent that after the connector member 32, tubular member 34 and valve device 36 are combined to form the vent assembly 30, the latter can be assembled to the reflector member 12 as seen in FIG. 1. This is accomplished by first having the fingers 42 of the connector member 32 axially aligned with the appropriate mounting hole 31 in the reflector member 12 after which the fingers 42 are pushed into the accommodating hole 31. Inasmuch as the size of the fingers 42 at the upper end thereof is greater than the diameter of the mounting hole 31 and they are barb-shaped as mentioned above, as the fingers 42 are pushed into the mounting hole 31, they will initially move radially inwardly after which they will spring back to their normal positions. This action will secure the vent assembly 30 to the reflector member 12 by providing a snap-type fit and the seal member 44 serves to seal the mounting hole 31 as seen in FIG. 1. After mounting the vent assembly 30 to the mounting hole 31 of the reflector member 12, it will be noted that if the valve device 36 is not properly positioned so as to cause the ball member 52 to rise to close passage 62 as a result of splash water flowing through the passage 72 into the chamber provided by the dome member 48, the valve device 36 can be rotated about the longitudinal axis of the cylindrical extension 58 of the dome member 48 to assure that the valve device 36 is positioned as seen in FIG. 2.

Once the vent assemblies 30 are connected to the reflector member 12 of the headlamp 10 as see in FIG. 1, the ball member 52 will normally assume the full line position of FIG. 2. In this position, the trough 76 is only partially closed by the ball member 52 and, as a consequence, permits ventilating air to flow into and out of the interior of the headlamp 10 via the passage 72, trough 76, passage 62, the passage in the tubular member 34 and the passage 38 in the connector member 32. If, however, the vehicle should encounter a puddle of water or be located in a car wash where water may be sprayed along the underside of the vehicle, the water entering the valve device 36 through the passage 72 will cause the ball member 52 to rise to close the passage 62 and prevent the water from gaining access to the interior of the headlamp.

Various changes and modifications can be made in the system disclosed herein without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a lamp having a reflector member the front portion of which is closed by a lens, said reflector member having a backwall defined by an inner curved reflecting surface and an outer support surface, a light source located at the focal point of the curved reflecting surface so as to allow said reflecting surface to project light rays forwardly through the lens, said reflector member having a mounting hole formed therein, a vent assembly connected to said mounting hole for preventing water from gaining access into the interior of the lamp while allowing air to flow into and out of the interior of the lamp so as to provide ventilation thereof, said vent assembly including a housing provided with a first passage for connection with the interior of said headlamp through said mounting hole, a second passage for connection with atmosphere, and a buoyant member located within the housing adapted to close said first passage when water enters the housing through said second passage.

2. In combination with a lamp having a reflector member the front portion of which is closed by a lens, said reflector member having a backwall defined by an inner curved reflecting surface and an outer support surface, a light source located at the focal point of the curved reflecting surface so as to allow said reflecting surface to project light rays forwardly through the lens, said reflector member having a mounting hole formed therein, a vent assembly including a connector member located in said mounting hole, said vent assembly having a valve device and a tubular member one end of which is connected to said connector and the other end thereof connected to said valve device for preventing water from gaining access into the interior of the lamp while allowing air to flow into and out of the interior of the lamp so as to provide ventilation thereof, said device including a housing provided with a first passage for connection with the other end of said tubular member, a second passage for connection with atmosphere, and a buoyant member located within the housing adapted to close said first passage when water enters the housing through said second passage.

3. In combination with a lamp having a reflector member the front portion of which is closed by a lens, said reflector member having a backwall defined by an inner curved reflecting surface and an outer support surface, a light source located at the focal point of the curved reflecting surface so as to allow said reflecting surface to project light rays forwardly through the lens, said reflector member having a mounting hole formed therein, a vent assembly including a connector member snap-fitted into said mounting hole, said vent assembly having a valve device and a tubular member one end of which is connected to said connector member and the other end of which is connected to said valve device for preventing water from gaining access into the interior of the lamp while allowing air to flow into and out of the interior of the lamp so as to provide ventilation thereof, said valve device including a housing formed by a pair of interconnected members, one of said interconnected members having a first passage for connection with the other end of said tubular member, a second passage provided in the other interconnected member for connection with atmosphere, and a buoyant member located within the valve device and adapted to close said first passage when water enters the housing through said second passage.

4. The combination set forth in claim 3 wherein said buoyant member is a spherical ball-shaped member.

5. The combination set forth in claim 3 wherein said connector member includes a plurality of spring fingers permitting the connector member to be snap-fitted into said mounting hole.

6. The combination set forth in claim 3 wherein said interconnected members are provided with guide means for controlling movement of the buoyant member.

7. The combination set forth in claim 6 wherein the vent device can be rotated as a unit relative to the tubular member for properly positioning the buoyant member so the latter will rise to close the first passage when water enters the housing.

8. The combination set forth in claim 7 wherein the connector member includes a seal member for sealing the mounting hole.

9. The combination set forth in claim 8 wherein a pair of vent assemblies are provided to vent the headlamp.

* * * * *